United States Patent
Haas et al.

(10) Patent No.: US 7,638,197 B2
(45) Date of Patent: Dec. 29, 2009

(54) COMPOSITE ELEMENTS MADE FROM POLYURETHANE MATERIALS HAVING SURFACES CONSISTING OF THERMOPLASTIC OR METALLIC LAYERS AND A PROCESS FOR THEIR PRODUCTION

(75) Inventors: Peter Haas, Haan (DE); Dirk Wegener, Monheim (DE); Reiner Paul, Leichlingen (DE); Detlef Mies, Elsdorf (DE)

(73) Assignee: Bayer MaterialScience AG, Leverkusen (DE)

( * ) Notice: Subject to any disclaimer, the term of this patent is extended or adjusted under 35 U.S.C. 154(b) by 673 days.

(21) Appl. No.: 11/044,972

(22) Filed: Jan. 27, 2005

(65) Prior Publication Data

US 2005/0170189 A1   Aug. 4, 2005

(30) Foreign Application Priority Data

Feb. 3, 2004   (DE) ................. 10 2004 005 223

(51) Int. Cl.
B32B 17/40    (2006.01)

(52) U.S. Cl. ................................. 428/423.1

(58) Field of Classification Search ............. 428/423.1, 428/457
See application file for complete search history.

(56) References Cited

U.S. PATENT DOCUMENTS

| | | | | |
|---|---|---|---|---|
| 3,537,929 A | * | 11/1970 | Keith et al. | 156/79 |
| 3,772,059 A | * | 11/1973 | Shikada | 427/246 |
| 4,230,838 A | * | 10/1980 | Foy et al. | 525/408 |
| 4,292,353 A | * | 9/1981 | Ohashi et al. | 428/211.1 |
| 5,158,607 A | | 10/1992 | Mafoti et al. | 106/243 |
| 6,210,523 B1 | | 4/2001 | Schmidt et al. | 156/331.4 |
| 6,471,905 B1 | | 10/2002 | Haas et al. | 264/331.19 |
| 6,499,797 B1 | | 12/2002 | Böhm et al. | 296/191 |
| 6,761,953 B2 | | 7/2004 | Haas et al. | 428/73 |
| 7,317,043 B2 | * | 1/2008 | Nakamura et al. | 523/201 |
| 2003/0134085 A1 | | 7/2003 | Haas et al. | 428/116 |
| 2004/0127591 A1 | | 7/2004 | Haas et al. | 521/170 |

FOREIGN PATENT DOCUMENTS

| | | |
|---|---|---|
| CA | 2093188 | 10/1993 |
| DE | 34 11 216 A1 | 10/1985 |
| DE | 101 60 374 | 6/2003 |
| EP | 262 378 A2 | 4/1988 |
| EP | 513 964 A2 | 11/1992 |
| EP | 1 077 225 | 4/2003 |
| WO | 00/53652 | 9/2000 |

* cited by examiner

*Primary Examiner*—Thao T. Tran
(74) *Attorney, Agent, or Firm*—N. Denise Brown; Noland J. Cheung

(57) ABSTRACT

The present invention relates to composite elements constructed from an outer layer (i), a fiber-reinforced polyurethane (PU) material which contains in-mold release additives as a supporting layer (ii), and optionally, a decorative inner layer (iii). This invention also relates to suitable processes for the production of these composite elements and to body components comprising these composite elements.

2 Claims, No Drawings

COMPOSITE ELEMENTS MADE FROM POLYURETHANE MATERIALS HAVING SURFACES CONSISTING OF THERMOPLASTIC OR METALLIC LAYERS AND A PROCESS FOR THEIR PRODUCTION

BACKGROUND OF THE INVENTION

The present invention relates to composite elements constructed from an outer layer (i) and a fiber-reinforced polyurethane (PU) foam with in-mold release additives as supporting layer (ii), and optionally, a decorative inner layer (iii). This invention also relates to suitable processes for the production of these composite elements, and to body components comprising these composite elements.

EP-A-995 667 and EP-A-1 077 225 describe the production of composite components that are constructed from a pigmented, thermoplastic film which is foam-backed with glass fiber-reinforced polyurethane. To produce the colored components, release agents are used for demolding from the modular mold. The composite components are used, for example, as roof modules in motor vehicles.

Furthermore, DE-A 10 160 374 describes a composite part with long glass fiber reinforcement, produced by the LFI (long fiber injection) PU process. In order to remove the part easily from the modular mold, release agents must be applied to the surface of the mold.

For reasons of fast, productive manufacture, it is desirable to avoid the use of external mold release agents. External mold release agents typically require additional spraying, evaporation and drying of the release agent in the mold, and subsequent removal of the release agent from the surfaces of the composite part before lamination or bonding of these components.

The object of the invention was to produce composite elements having excellent mechanical properties and good surface qualities, in which the composite element comprised an outer layer (i) and a supporting layer adhered the outer layer and which comprised fiber-reinforced polyurethane (ii), and optionally, a decorative layer adhered to this supporting layer as an inner layer (iii), wherein the composite elements are formed or produced in such a way that there is no need to use an external mold release agent.

It has now been found that, certain PU formulations which contain specific in-mold release additives can be used in these composite elements. These particular PU formulations provide a very good release behavior from the modular molds, and a very good adhesive bond to all composite layers, i.e. the outer layer (i), the fiber-reinforced polyurethane layer (ii), and, when present, the decorative layer (iii), and additionally, good adhesive bonds to any strengthening and reinforcing elements that are present can also be achieved.

SUMMARY OF THE INVENTION

The present invention provides composite elements that is constructed from an outer layer (i) that is optionally preformed, and is prepared from a material selected from the group consisting of thermoplastics or metals, a supporting layer (ii) which adhers to the outer layer and comprises a fiber-reinforced polyurethane material, and optionally, a decorative layer that partially adhers to the supporting layer and serves as an inner layer (iii). The fiber-reinforced polyurethane material suitable herein contains one or more in-mold release additives, which comprise:

A) one or more polycondensates of carboxylic acids having a chain length of 8 to 40 carbon atoms, that are optionally mixed with one or more dicarboxylic acids and/or one or more polyhydric alcohols, and, optionally, B) one or more carboxylic acids having a chain length of 8 to 40 carbon atoms, and, optionally, C) one or more ammonium salts of at least one carboxylic acid having a chain length of 8 to 40 carbon atoms and at least one diamine having at least one primary amino group and at least one tertiary amino group.

Another aspect of the present invention is a process for producing these composite elements that are constructed from an outer layer (i), a fiber-reinforced polyurethane material as a supporting layer (ii), and, optionally, a decorative layer or material as inner layer (iii), in which the layers adhere to each other. This process comprises the steps:

(1) introducing an outer layer (i) into the bottom shell of a mold,
(2) optionally, introducing a decorative material as inner layer (iii) into the top shell of the mold,
(3) optionally, applying a fiber mat reinforcement onto the outer layer (i), onto the decorative material, or into the top shell of the mold,
(4) applying a polyurethane material onto the outer layer (i), onto the decorative material, or onto the fiber mat reinforcement,
(5) reacting the polyurethane material in the mold, and
(6) removing the resultant polyurethane composite element from the mold.

In this process, the polyurethane material comprises:
a) at least one polyisocyanate,
b) at least one isocyanate-reactive compound,
c) optionally, one or more reinforcing materials,
d) one or more catalysts,
e) one or more blowing agents,
f) optionally, one or more additives and/or auxiliary substances, and
g) one or more in-mold release additives.

In accordance with the present invention, suitable in-mold release additives comprise:

A) one or more polycondensates of carboxylic acids having a chain length of 8 to 40 carbon atoms, that are optionally mixed with one or more dicarboxylic acids and/or one or more polyhydric alcohols, and, optionally, B) one or more carboxylic acids having a chain length of 8 to 40 carbon atoms, and, optionally, C) one or more ammonium salts of at least one carboxylic acid having a chain length of 8 to 40 carbon atoms and at least one diamine having at least one primary amino group and at least one tertiary amino group.

Another suitable process for the production of composite elements of the present invention comprises the steps:
(1) introducing an outer layer (i) into the bottom shell of a mold,
(2) optionally, applying a fiber mat reinforcement onto the outer layer (i), onto the decorative material which acts as an inner layer (iii), or into the top shell of the mold,
(3) applying a polyurethane material onto the outer layer (i), onto the decorative material, or onto the fiber mat reinforcement,
(4) reacting the polyurethane material in the mold, (5) removing the resultant polyurethane composite element from the mold, and, optionally, (6) applying a decorative material (iii) onto one side of the polyurethane composite element, such that the decorative material (iii) is on the opposite side of the polyurethane layer than the side the outer layer (i) is on.

In this process, suitable polyurethane materials for step (3) are those as described in the process above which additionally contain one or more in-mold release additives A), and optionally B) and optionally C). The other components of the polyurethane material are as described above.

Another process for producing the composite elements described above, comprises the steps of:

(1) introducing an outer layer (i) into the bottom shell of a mold, (2) optionally, introducing a decorative material as inner layer (iii) into the top shell of the mold, (3) optionally, applying a fiber mat reinforcement onto the outer layer (i), onto the decorative material which acts as an inner layer (iii), or into the top shell of the mold, (4) simultaneously applying one or more reinforcing fibers and a polyurethane material onto the outer layer (i), onto the decorative material, or onto the fiber mat reinforcement, (5) reacting the polyurethane material in the mold, and (6) removing the resultant polyurethane composite element from the mold.

In this process, suitable polyurethane materials for step (4) are those as described in the process above which additionally contain one or more in-mold release additives A), and optionally B) and optionally C). The other components of the polyurethane material are as described above.

Finally, another suitable process for producing the composite elements of the present invention comprises the steps of:

(1) introducing an outer layer (i) into the bottom shell of a mold, (2) optionally, applying a fiber mat reinforcement onto the outer layer (i), onto the decorative material which acts as an inner layer (iii), or into the top shell of the mold, (3) simultaneously applying or more reinforcing fibers and a polyurethane material onto the outer layer (i), onto the decorative material, or onto the fiber mat reinforcement, (4) reacting the polyurethane material in the mold, (5) removing the resultant polyurethane composite element from the mold, and, optionally, (6) applying a decorative material (iii) onto one side of the polyurethane composite element, such that the decorative material (iii) is on the opposite side of the polyurethane layer than the side the outer layer (i) is on.

In this process, suitable polyurethane materials for step (4) are those as described in the process above which additionally contain one or more in-mold release additives A), and optionally B) and optionally C). The other components of the polyurethane material are as described above.

Finally the invention relates to body components for motor vehicles, and particularly roofs, hardtops, doors, bonnets, boot lids, tailgates and bumpers, in which the body component comprises the composite elements as described hereinabove.

DETAILED DESCRIPTION OF THE INVENTION

The composite parts according to the invention consist of an outer layer (i), a supporting layer (ii), and optionally, an inner layer (iii).

Suitable materials to be used as the outer layer (i) in accordance with the present invention include, for example, thermoplastics, or metal foils or sheets. These materials can be deep-drawn or shaped. They may be pre-shaped or they may shaped at the time of placing in the mold for forming the composite element in accordance with the present invention.

Suitable thermoplastic materials to be used as the outer layer (i) of the present composite elements include, for example, the commercially available thermoplastics that are based on acrylonitrile-butadiene-styrene (ABS), polymethyl methacrylate (PMMA), acrylonitrile-styrene-acrylate (ASA), poly-carbonate (PC), polycarbonate and acrylonitrile-butadiene-styrene blend (PC-ABS), polycarbonate and acrylonitrile-styrene-acrylate blend (PC-ASA), thermoplastic polyurethane (TPU), polypropylene (PP), polyethylene (PE) or polyvinyl chloride (PVC), and combinations thereof. Depending on the end-use are of application, it is preferred that the outer-layer (i) comprise at least two layers, and optionally three layers, of different thermoplastic materials.

Suitable metal foils or sheets which can be used as the outer layer (i) generally consist of metals and metal alloys which can be deep-drawn or shaped. Aluminium is preferred here.

The outer layers (i) of the composite element conventionally display thicknesses of 0.1 to 5 mm, preferably 0.6 to 2 mm.

The supporting layer (ii) consisting of fiber-reinforced PU is adhesively joined to the outer layer (i). In the composite elements of the present invention, this fiber-reinforced polyurethane is a polyurethane foam with in-mold release additives. Suitable self-releasing polyurethane foam can be obtained by reacting the structural components a) to g), which are described below.

Suitable polyisocyanates to be used as component a) in the polyurethane component include, for example, those generally known (cyclo)aliphatic and/or, in particular, aromatic polyisocyanates. Particularly suitable are aromatic diisocyanates, and more preferably diphenylmethane diisocyanate (MDI) and toluylene diisocyanate (TDI). The isocyanate component can be used either in the form of the pure compound or in modified form such as, for example, in the form of uretdiones, isocyanurates, allophanates or biurets, or preferably, in the form of reaction products containing urethane and isocyanate groups which are commonly known as isocyanate prepolymers.

Polyols such as polyetherols and/or polyesterols are typically used as isocyanate-reactive compounds b). Polyether polyalcohols with a functionality of 1.9 to 8.0 and a hydroxyl value of 50 to 1000 mg KOH/g, and that optionally contain from 10 to 100% primary hydroxyl groups, are preferred. Such polyether polyols are generally known and commercially readily available. These are based on, for example, conventional starter compounds, which are reacted with conventional alkylene oxides such as, for example, propylene oxide and/or ethylene oxide, under generally known reaction conditions. The content of primary hydroxyl groups can be achieved by finally reacting the polyols with ethylene oxide. These isocyanate-reactive compounds b) can optionally be used alone or as a mixture with other known isocyanate-reactive compounds such as, for example, conventional polyols based on polycarbonate diols.

The isocyanate-reactive compounds b) can be used in combination with one ore more chain extenders and/or crosslinking agents. Suitable chain extenders are the primarily 2-functional alcohols having molecular weights of 60 to 499, and includes compounds such as, for example, ethylene glycol, propylene glycol, butanediol-1,4, and pentanediol-1,5. Suitable crosslinking agents are compounds having molecular weights of 60 to 499 and that contain 3 or more active H atoms, preferably amines and particularly preferably alcohols. Examples of such compounds includes glycerol, trimethylol propane and/or pentaerythritol, and particularly alkoxylation products thereof.

Suitable polyurethane systems can also contain reinforcing materials c) in a quantity of from 0 to 80 wt. %, preferably from 1 to 50 wt. %, more preferably from 2 to 30 wt. %, based on 100% by weight of components a) and b). These reinforcing materials generally lead to a reinforcing of the polyurethane foam and help to improve its mechanical properties. The reinforcing materials are preferably used in the form of fibers and/or platelets. Suitable materials to be use as reinforcing materials include, for example, conventional mineral fibers, preferably glass fibers, or synthetic fibers, such as e.g. polyamide fibers, polyester fibers, carbon fibers or polyurethane fibers, and mixtures thereof, are also suitable. Also, suitable as reinforcing materials are the platelet-shaped fillers including those typically called glass flakes, or mineral substances such as mica.

It is also typical to include one or more catalysts d) in the polyurethane materials of the present invention. Conventional compounds which are known to accelerate the reaction of component a) with component b) can be used as catalysts d).

Suitable examples include tertiary amines and/or organic metal compounds, particularly tin compounds. The following compounds can also be used as catalysts, for example: triethylene diamine, aminoalkyl and/or aminophenyl imidazoles and/or tin(II) salts of organic carboxylic acids. Catalysts are generally used in a quantity of 0.1 to 5 wt. %, based on 100 weight % of component b).

The generally known chemically or physically acting compounds which are known to act as blowing agents can be used as component e) herein. Water can be, and preferably is, used as a chemically acting blowing agent. Water forms carbon dioxide by reaction with the isocyanate groups. Examples of suitable physical blowing agents are (cyclo)aliphatic hydrocarbons, preferably those having 4 to 8, more preferably 4 to 6 and most preferably 5 carbon atoms, partially halogenated hydrocarbons or ethers, ketones or acetates. The amount of blowing agents used depends on the desired density of the PU foams. The various blowing agents can be used individually or in any combination with one another. It is particularly preferable to only use water as the sole blowing agent. Generally, when water is the sole blowing agent, it is used in a quantity of from 0.1 to 5 wt. %, and preferably from 0.5 to 4 wt. %, relative to 100 weight % of compounds as component b) in the polyurethane.

The reaction is optionally performed in the presence of one or more auxiliary substances and/or one or more additives f). Such auxiliary substances and/or additives include, for example, cell regulators, cell openers, surface-active compounds and/or stabilizers to prevent oxidative or thermal degradation or aging.

In accordance with the present invention, the in-mold release additives g) comprise:

A) one or more polycondensates of carboxylic acids having a chain length of 8 to 40 carbon atoms, that are optionally mixed with one or more dicarboxylic acids and/or one or more polyhydric alcohols, and, optionally, B) one or more carboxylic acids having a chain length of 8 to 40 carbon atoms, and, optionally, C) one or more ammonium salts of at least one carboxylic acid having a chain length of 8 to 40 carbon atoms and at least one diamine having at least one primary amino group and at least one tertiary amino group.

Suitable in-mold release additives of the present invention require A) one or more polycondensates as described above. In addition, these in-mold release additives may require B) one or more carboxylic acids and/or C) one or more ammonium salts as described above. Thus, the in-mold release additives may comprise A) alone; a combination of A) and B); a combination of A) and C); or a combination of A), B) and C).

Reinforcing materials may optionally either be applied separately in the mold before the introduction of the polyurethane system, or they may be introduced simultaneously with the polyurethane system (in situ) into the modular mold. The suitable types of reinforcing materials depends on how and when the reinforcing materials are introduced, i.e. separately or simultaneously. When introducing the reinforcing materials separately, these can consist of continuous glass strand or chopped glass strand mats, non-woven glass fiber cloths, woven glass fiber cloths, natural fiber mats, etc. When introduced simultaneously with the polyurethane system, suitable reinforcing materials include, for example, long fibers cut from natural fiber or glass fiber rovings. The natural fiber reinforcing materials include, for example flax, jute, hemp or sisal fibers. The separately introduced fiber mats are processed by the known S-RIM method, and the long fibers that are introduced in situ cut and from rovings, having lengths of between 12.5 and 100 mm, are processed by the long-fiber PU (LFI/PU) injection process.

The fiber-reinforced PU supporting layer (ii) according to the invention generally displays a thickness of from 1 to 50 mm, preferably from 10 to 25 mm. The preferred density is between about 300 and about 1400 g/l, particularly preferably in the range from about 450 to about 900 g/l. The supporting layers are also characterized by the following mechanical property values: tensile strength according to DIN EN ISO 527 of 10 to 55 MPa, tensile modulus of elasticity according to DIN EN ISO 527 of 900 to 5200 MPa, flexural modulus of elasticity according to DIN 53293 of 1200 to 6200 MPa and flexural strength according to DIN 53293 of 20 to 125 MPa.

The reaction of the polyurethane system that is introduced to form the fiber-reinforced polyurethane foam according to the invention as supporting layer (ii) takes place in the closed modular mold with a 5- to 15-fold compression of the polyurethane foam. The compression factor is calculated here by dividing the polyurethane density in the composite part by the polyurethane density in the freely expanded foam.

The decorative layer which is optionally present in the composite elements of the present invention can be made of thermoplastics, leather, textiles, plastic foams, metals, etc. In situations when a metal is used, the metal is typically pretreated, for example, it is phosphatized. In situations when a plastic foam is used, the foam is typically of a different chemical composition that the reinforced PU foam layer. The thickness of the decorative layer varies, and preferably ranges from about 0.05 mm up to about 5 mm, depending on the composition of the decorative layer.

In accordance with the present invention, a decorative layer is only used in the composite elements for decorative purposes. It provides a decorative surface on one side or part of one side of the produced composite element as it partly covers one surface of the reinforced polyurethane foam layer. When used, the decorative layer is one of the exposed layers. For example, when making a car roof, the decorative layer is the layer exposed to the inside of the car where the passengers sit. The reinforced PU layer is located between the outer layer and the decorative layer (when present).

This decorative layer may either be placed in the mold before the polyurethane material is added and thus, form part of the composite elements of the invention. It is also possible to apply this decorative layer to the exposed surface of the polyurethane material after removing the polyurethane composite from the mold.

After curing of the polyurethane foam the composite components according to the invention can be removed from the mold.

The amounts of isocyanate (a) and the isocyanate-reactive compounds (b) used to produce the supporting layer (ii) correspond to an equivalence ratio of preferably 0.90:1 to 1.5:1, and particularly preferably of 1:1 to 1.2:1.

The modular mold temperatures conventionally established for modular part manufacture are in the range from 30 to 90° C., but preferably 40 to 80° C.

The invention is described below using the manufacture of a roof module by way of example.

The following examples further illustrate details for the preparation and use of the composites of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

Example of Roof Module Production

As outer layer (i) a colored, scratch-resistant, chemical-resistant thermoplastic film from GE Plastics (commercially available as Lexan® SLX), which was thermoformed in advance and pretreated for the manufacturing process, was placed in the lower half of the open modular mold. The lower mold half was heated to approx. 40 to 45° C. As an inner layer (iii), a decorative layer which had been inhibited from fully foaming was introduced into the upper half of the mold such that it fitted exactly, and was securely held in place by a clamping frame and vacuum technology. Then the inserts were introduced. The temperature of the upper mold half was 75 to 80° C. The simultaneous introduction of the PU system and of the long glass fibers cut from glass rovings (as previously described) occurred through an LFI-PU mixing head supplied by Krauss-Maffei, with the distribution of the polyurethane fiber mixture performed by a robot in programmed paths. The glass fiber content, relative to the polyurethane supporting layer, was 23 wt. %.

In the decorative-free areas, the composite elements produced in this way from the self-releasing PU foams according to the invention displayed entirely problem-free release behaviour. This was so even in the subsequent manufacturing processes, as is shown in Table 1 below. The treatment of the surfaces of the mold with release agent before production of each composite part to prevent adhesion of the PU foam and to allow easy mold release, which would otherwise be conventional, was omitted. The mold was merely sprayed with a commercial release agent at the start of manufacture.

Even after 25 releases from the mold, the composite elements according to the present invention displayed good release behaviour, combined with good adhesion between the individual layers (i), (ii) and (iii). Moreover, they had comparable mechanical properties to the samples produced from the standard material which was produced with an external release agent. Even after conditioning at 110° C. for 1 hour the parts according to the invention displayed no visible differences from the parts manufactured by the standard process from standard PU foams.

TABLE 1

Construction and processing performance of the PU systems according to the invention (AA, BB, CC) in comparison to the standard PU system (prior art).

|  | AA | BB | CC | Comparison |
| --- | --- | --- | --- | --- |
| PU system |  |  |  |  |
| Polyether polyol 1) (parts by wt.) | 40 | 40 | 40 | 40 |
| Polyether polyol 2) (parts by wt.) | 20 | 20 | 20 | 20 |
| Polyether polyol 3) (parts by wt.) | 10 | 10 | 10 | 10 |
| Polyether polyol 4) (parts by wt.) | 8 | 8 | 8 | 8 |
| In-mold release additive A) (parts by wt.) | 10 | 5 | 5 | — |
| In-mold release additive B) (parts by wt.) | — | 5 | — | — |
| In-mold release additive C) (parts by wt.) | 5 | 5 | — | — |
| Water (parts by wt.) | 1.2 | 1.2 | 1.2 | 1.2 |
| Activator (parts by wt.) | 0.5 | 0.5 | 0.5 | 0.5 |
| Stabiliser (parts by wt.) | 2.5 | 2.5 | 2.5 | 2.5 |
| Isocyanate 1) (parts by wt.) | 168 | 168 | — | 165 |
| Isocyanate 2) (parts by wt.) | — | — | 188 | — |
| Processing performance |  |  |  |  |
| Use of release agent (Acmos 35-4181) | 1x at start of manufacture | 1x at start of manufacture | 1x at start of manufacture | for each composite part |
| Releases | >25 | >25 | >25 | 1 |

TABLE 1-continued

Construction and processing performance of the PU systems according to the invention (AA, BB, CC) in comparison to the standard PU system (prior art).

|  | AA | BB | CC | Comparison |
|---|---|---|---|---|
| Release performance | good | good | good | good |
| Adhesion between composite layers | good | good | good | good |

Description of Raw Materials

In-mold release additive A): OH value=54.3 mg KOH/g, acid value=22.5 mg KOH/g

In-mold release additive B): OH value=56 mg KOH/g

In-mold release additive C): amine value=82 mg KOH/g

Polyether polyol 1): OH value=1010 mg KOH/g

Polyether polyol 2): OH value=450 mg KOH/g

Polyether polyol 3): OH value=620 mg KOH/g

Polyether polyol 4): OH value=28 mg KOH/g

Isocyanate 1): 4,4'-MDI with higher-functional isomers, NCO content=31.5 wt. %

Isocyanate 2): isocyanate 1) modified with in-mold release additive C), NCO content=28 wt. %

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite element comprising an outer layer (i) which comprises a material selected from the group consisting of thermoplastics and metals, a supporting layer (ii) comprising a reinforced polyurethane material, and, optionally, a decorative inner layer (iii), in which there is adhesion between layers (i), (ii), and, optionally, (iii), and in which the reinforced polyurethane material comprises one or more internal in-mold release additives comprising:

A) one or more polycondensates of carboxylic acids having a chain length of 8 to 40 carbon atoms, and one or more polyhydric alcohols, in which the carboxylic acids are optionally mixed with one or more dicarboxylic acids, and, optionally, B) one or more carboxylic acids having a chain length of 8 to 40 carbon atoms, and, optionally, C) one or more ammonium salts of at least one carboxylic acid having a chain length of 8 to 40 carbon atoms, and at least one diamine having at least one primary amino group and at least one tertiary amino group.

2. The composite element of claim 1, wherein said reinforced polyurethane material has an isocyanate index ranging from 90 to 150.

\* \* \* \* \*